E. FUCHS.
CHANGE SPEED GEARING.
APPLICATION FILED DEC. 8, 1914.
1,143,044.
Patented June 15, 1915.
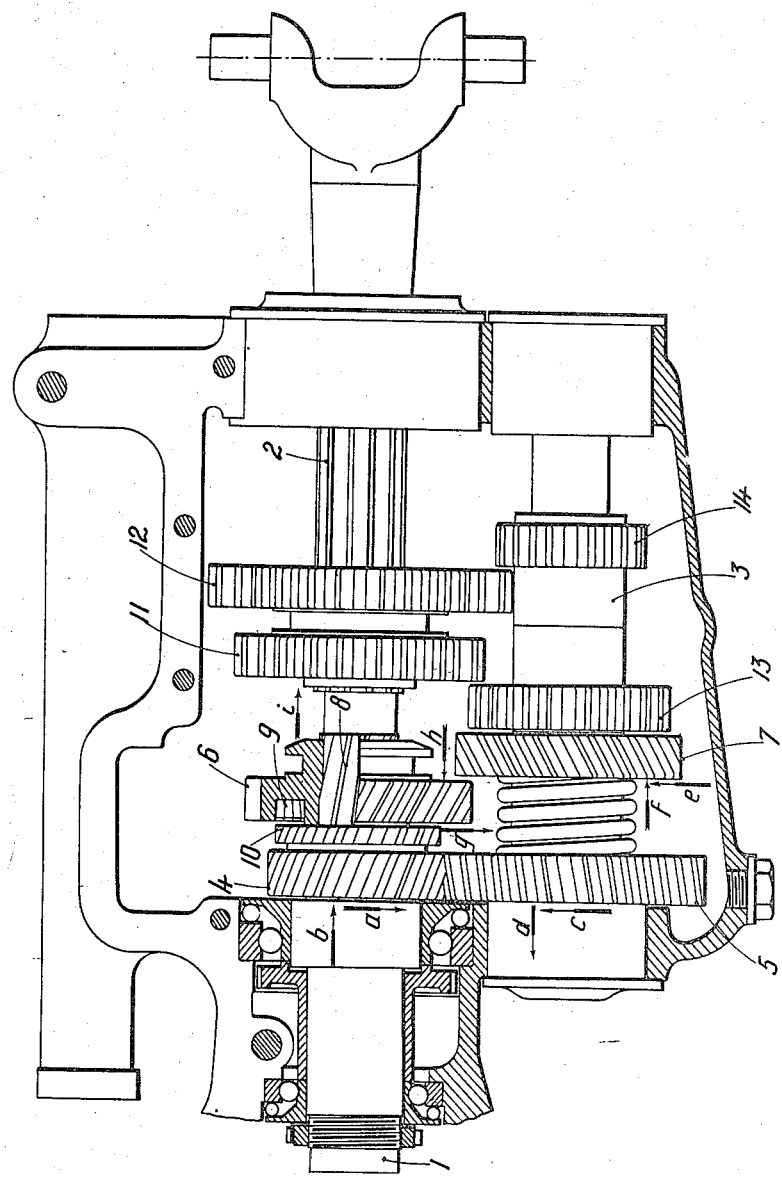

UNITED STATES PATENT OFFICE.

ERNEST FUCHS, OF BILLANCOURT, FRANCE, ASSIGNOR TO LOUIS RENAULT, OF BILLANCOURT, FRANCE.

CHANGE-SPEED GEARING.

1,143,044.   Specification of Letters Patent.   Patented June 15, 1915.

Application filed December 8, 1914.   Serial No. 876,055.

*To all whom it may concern:*

Be it known that I, ERNEST FUCHS, citizen of the French Republic, residing at Billancourt, Department of the Seine, in France, have invented certain new and useful Improvements in or Relating to Change-Speed Gearing; and I do hereby declare the following to be a full, clear, and exact description of the invention, such as will enable others skilled in the art to which it appertains to make and use the same.

The invention relates to a change speed gearing having helically toothed gear wheels mainly used in automobile vehicles in order to obtain a silent transmission. In this gearing the sliding pinions formed with helical teeth slide upon a shaft formed with helical grooves or keys directed in the same direction and having substantially the same pitch as the teeth of the pinions. The lateral reaction produced by the inclination of the teeth is thus compensated by the reaction produced by the inclination of the grooves or driving keys provided on the shaft. In this manner, all efforts upon the forks of the sliding pinions for maintaining the pinions in engagement, are avoided.

The annexed drawing shows in section and by way of an example a change speed gearing in accordance with the invention.

The gearing is of the ordinary four speed type, and comprises a driving shaft 1, a driven shaft 2 mounted in alinement with the driving shaft, and a secondary shaft 3. Upon the end of shaft 1 within the change speed gearing, a pinion 4 is mounted, having helical teeth inclined in the suitable direction, for instance in the illustrated case, toward the right. This pinion is always in engagement with a helical wheel 5 carried by the secondary shaft 3. A sliding pinion 6 having helical teeth may be either caused to engage with a wheel 7 integral with the shaft 3, or be coupled through the medium of special teeth, with the pinion 4 in order to obtain a direct drive. The sliding pinion 6 is in engagement, through the medium of its hub, with the grooves 8 formed helically on the driven shaft 2. This helix is directed in the same direction and of substantially the same pitch as that of the teeth of the pinion 6. In this manner its lateral reaction compensates that received by the pinion 6 as will be more fully described hereinafter. The pinion 6 is formed upon its face turned toward the pinion 4, with internal teeth 9 adapted to engage the pinion 4 or more exactly, with the special teeth 10 of the pinion 4. In order to obtain the other two speeds, use may be made of sliding double change speed pinions 11, 12, sliding upon the shaft 2 and adapted to be caused to engage either with a pinion 13 or with a pinion 14 both integral with the secondary shaft 3.

This change speed gearing operates in the following manner: For the third speed, the sliding pinion 6 is brought into engagement with the gear wheel 7. It will be noted that the pinions 4, 10 and 7 are so-called driving pinions, while the gear wheels 5, and 6 are so-called driven pinions. The pinion 4 is driven from the shaft 1 in the direction indicated by the arrow $a$ and as its helix is a right handed one and it is a driving pinion, it receives a lateral thrust directed in the direction indicated by the arrow $b$; this reaction is supported by an end thrust ball bearing. The helical pinion 5 rotates in the direction indicated by the arrow $c$; it is a driven pinion and receives a thrust in the direction indicated by the arrow $d$. With regard to the pinion 7 which is a driving pinion, it rotates in the direction indicated by the arrow $e$ and receives a lateral thrust in the direction indicated by the arrow $f$ which compensates the lateral thrust of the pinion 5. The sliding pinion 6 is a driven pinion and rotates in the direction indicated by the arrow $g$; it receives a reaction directed in the direction indicated by the arrow $h$. The pitch of the helix formed on the shaft 2 is substantially equal to that of the teeth of the pinion 6 and the inclination of the grooves being in the same direction as that of the teeth of the same pinion, the reaction produced by the grooves is directed according to the arrow $i$ and compensates the reaction $h$ received by the pinion 6 then in engagement with the pinion.

In order to obtain a direct drive, the pinion 10 integral with the pinion 4 is brought into engagement with the teeth 9 of the pinions 6. The reaction of the pinion 4 is directed in the direction indicated by the arrow $b$ while the reaction received by the pinion 6 the teeth 9 of which are in engagement with the pinion 10, is directed in the direction indicated by the arrow $h$ opposite to the arrow b thus tending to increase the solidarity between the two pinions. Suppose that the vehicle drives the engine, for instance, during a descent, the teeth 9 will tend owing to their inclination, to disengage from the teeth 10; but at the instant, the shaft 2 which is then connected with the shaft 1, has become a driving instead of a driven shaft, it communicates to the pinion 6 a reaction in the direction indicated by the arrow h produced by the grooves 8 which compensates the reaction due to the inclination of the teeth 9. The same takes place in the case of the pinion 6 when it is in engagement with the pinion 7, the effort coming either from the engine or from the transmission driving the engine through the medium of the helical teeth formed on the shaft 2. All the reactions are equilibrated and the forks controlling the sliding pinions are not subjected to any effect for maintaining the pinions in engagement.

The pinions 11, 12, 13, 14 are pinions with straight teeth in the case of the construction illustrated; it is evident that they may be also formed with helical teeth mounted in such a manner that the reactions compensate one another. In the latter case, the inclination of the teeth will be selected so as to be consistent with the dimensions of the pinions in use. There is no reason why this inclination should be the same as that of the teeth of the pinion 6. It will be merely necessary to give the helical grooves or keys formed upon the shaft 2 on which the pinions 11 and 12 slide, inclinations in the same direction and of substantially the same pitches as those of the teeth formed on these pinions. The pinions 4 and 5 illustrated with helical teeth may be also formed with straight teeth. The advantage of the arrangement adopted consists in the compensation of the lateral thrusts borne by the shaft 3 and produced by the teeth of the pinions 7 and 5.

I claim:

1. Transmission gearing comprising two rotary shafts, meshing gears carried by said shafts having helical teeth, and a helical sliding connection between one of said gears and its shaft, for the purpose described.

2. Transmission gearing comprising two rotary shafts, meshing gears carried by said shafts having helical teeth, a sliding connection between at least one of the gears and its shaft capable of compensating for the end thrusts of the sliding gear caused by said helical teeth.

3. Change speed gearing comprising a driving shaft, an intermediate shaft and a driven shaft, a sliding gear on one of said shafts, a gear mounted on an adjacent shaft, said gears having meshing helical teeth and said sliding gear having a helical sliding connection with its shaft, for the purpose described.

In testimony whereof I affix my signature, in presence of two witnesses.

ERNEST FUCHS.

Witnesses:
 DAVID C. POOLE, Jr.,
 HENRI COHEN.